United States Patent
Kim

(10) Patent No.: US 9,500,275 B2
(45) Date of Patent: Nov. 22, 2016

(54) FLAP TYPE ELECTRONIC AUTOMATIC TRANSMISSION LEVER

(71) Applicant: Hyundai Motor Company, Seoul (KR)

(72) Inventor: Eun-Sik Kim, Kwangmyong-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/563,581

(22) Filed: Dec. 8, 2014

(65) Prior Publication Data

US 2015/0167825 A1    Jun. 18, 2015

(30) Foreign Application Priority Data

Dec. 17, 2013   (KR) ........................ 10-2013-0156940

(51) Int. Cl.
| | |
|---|---|
| *F16H 59/02* | (2006.01) |
| *B60K 20/02* | (2006.01) |
| *F16H 59/08* | (2006.01) |
| *F16H 59/12* | (2006.01) |

(52) U.S. Cl.
CPC ............. *F16H 59/02* (2013.01); *B60K 20/02* (2013.01); *F16H 59/08* (2013.01); *F16H 59/12* (2013.01); *Y10T 74/2003* (2015.01); *Y10T 74/2014* (2015.01)

(58) Field of Classification Search
CPC .. F16H 59/02; F16H 59/0217; F16H 59/044; F16H 59/105; F16H 59/12; F16H 61/0213; G05G 1/02; G05G 1/025; G05G 13/00; G05G 13/02; G05G 15/00; G05G 15/02; G05G 15/007; H01H 2003/0293; H01H 3/122; H01H 19/025; H03K 2217/960755; H03K 2017/9613
USPC ............... 74/473.1, 473.12, 473.3; 108/4, 7; 345/173
See application file for complete search history.

(56) References Cited

U.S. PATENT DOCUMENTS

| | | | | |
|---|---|---|---|---|
| 4,243,900 | A * | 1/1981 | Niven | H02K 37/04 310/269 |
| 5,252,798 | A * | 10/1993 | Kamada | H01H 9/182 200/310 |
| 5,703,625 | A * | 12/1997 | Snider | B60Q 3/004 345/102 |
| 7,541,553 | B2 | 6/2009 | Meyer et al. | |
| 8,199,114 | B1 * | 6/2012 | Jaeger | G06F 3/03545 178/18.01 |
| 8,466,871 | B2 * | 6/2013 | Ishii | B60K 37/06 345/156 |
| 8,730,166 | B2 * | 5/2014 | Larsen | A63F 13/214 345/157 |
| 9,021,912 | B2 * | 5/2015 | Hermansson | F16H 61/24 74/473.3 |
| 2006/0256090 | A1 * | 11/2006 | Huppi | A63F 13/02 345/173 |
| 2015/0203056 | A1 * | 7/2015 | Adkins | H03K 17/962 307/10.1 |

\* cited by examiner

*Primary Examiner* — David M Fenstermacher
*Assistant Examiner* — Joseph Brown
(74) *Attorney, Agent, or Firm* — Morgan, Lewis & Bockius LLP

(57) ABSTRACT

A flap type electronic automatic transmission lever apparatus may include a console, a shift flap unit electrically connected to a transmission control unit (TCU) of a vehicle at a center of the console, and having at last four or more shift flaps, touch sensor units, each including a shift sensor disposed at a center of a corresponding shift flap, a forward-turn sensor disposed at an upper portion of the corresponding shift flap, and a rearward-turn sensor disposed at a lower portion of the corresponding shift flap, a shafts, each connected to a bottom of the corresponding shift flap to enable the corresponding shift flap to turn, step motors, each connected to one end of corresponding shaft, and shaft-fixing portions, each connected to an opposite end of the corresponding shaft.

5 Claims, 4 Drawing Sheets

FLAP TYPE ELECTRONIC AUTOMATIC TRANSMISSION LEVER

CROSS-REFERENCE TO RELATED APPLICATION

The present application claims priority to Korean Patent Application No. 10-2013-156940 filed on Dec. 17, 2013, the entire contents of which is incorporated herein for all purposes by this reference.

BACKGROUND OF THE INVENTION

1. Field of the Invention

The present invention relates to an automatic transmission for a vehicle, and more particularly, to a flap type electronic automatic transmission lever of which the operability, safety, and commercial value are improved by making an electronic automatic transmission lever in a flap type.

2. Description of Related Art

In general, automotive automatic transmissions have a shift mode that operates in order of a P-range, an R-range, an N-range, a D-range, and other ranges. In vehicles equipped with an automatic transmission that automatically change the shift ranges in accordance with the speed of the vehicles in motion, a transmission lever that enables a driver to change the shift mode of the automatic transmission is provided.

The driver in a vehicle with an automatic transmission can selectively change the shift mode of the automatic transmission into Parking (P-range), Reverse (R-range), Neutral (N-range), and Drive (D-range) in accordance with the driving situation by operating the transmission lever.

In the related art, tiptronic type mode converting devices have been generally used in which a transmission lever directly connected to an automatic transmission through a mechanical mechanism to be operated by a driver transmits an operation force applied to the transmission lever directly to the automatic transmission, thereby controlling the shift mode.

However, according to the shift mode converting devices for an automatic transmission of the related art in which the shift mode is changed by a mechanical mechanism, the convenience of driving is poor because the driver has to apply a force for controlling the shift mode in person through the transmission lever in order to change the shift mode, and usability of the interior of a vehicle is deteriorated because the transmission lever is disposed at the center of the console at a side of the driver's seat.

Accordingly, a transmission lever for an electronic automatic transmission has been developed in which a transmission lever is moved in a predetermined direction to a predetermined distance, even when a small operation is applied, an electronic control device senses the moving direction and movement, and an operation part, such as an actuator or an electric motor, changes the shift mode of the automatic transmission.

However, since the transmission lever for an electronic automatic transmission also has the type of operating the lever that moves forward/rearward, the operation type is similar to that of the mechanical transmission lever of the related art and it is not considered as having a remarkable advantage. Further, the spaces for the transmission lever and the accessories of the transmission lever are large, so reception spaces such as a cup holder and spaces for buttons for specific functions are insufficient. Furthermore, the transmission lever protrudes upward, so the head and body of a driver or a passenger may be seriously injured in a collision.

Further, since the transmission lever protrudes, there is still a problem in that the esthetic appearance is bad and a driver has difficulty in seeing the shift ranges due to a poor shift range display function at the transmission lever.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a flap type electronic automatic transmission lever that has excellent operability, improved safety, and an excellent esthetic appearance by making an electronic automatic transmission lever for a vehicle in a flap type.

Further, the present invention provides a flap type electronic automatic transmission lever that has a low manufacturing cost and improves fuel efficiency by device of a simple configuration in comparison to the transmission levers of the related art.

The technical subjects to implement in an exemplary embodiment of the present invention are not limited to the technical problems described above and other technical subjects that are not stated herein will be clearly understood by those skilled in the art from the descriptions of the present invention.

In an aspect of the present invention, a flap type electronic automatic transmission lever apparatus may include a console, a shift flap unit electrically connected to a transmission control unit (TCU) of a vehicle at a center of the console, and having at last four or more shift flaps, touch sensor units, each including a shift sensor disposed at a center of a corresponding shift flap, a forward-turn sensor disposed at an upper portion of the corresponding shift flap, and a rearward-turn sensor disposed at a lower portion of the corresponding shift flap, a shafts, each connected to a bottom of the corresponding shift flap to enable the corresponding shift flap to turn, step motors, each connected to one end of corresponding shaft, and shaft-fixing portions, each connected to an opposite end of the corresponding shaft.

The shift flap unit may include a parking-flap (P), a reverse-flap (R), a neutral-flap (N), and a drive-flap (D) and may further include a high range flap or a low range flap.

The flap type electronic automatic transmission lever apparatus may further include light sources disposed under the shift flaps, respectively, wherein a current shift range is seen by turning on only the light source under the shift flap corresponding to the current shift range of the vehicle.

When the forward-turn sensor senses a touch, the corresponding shift flap is turned forward by the corresponding step motor, and when the rearward-turn sensor senses a touch, the corresponding shift flap is turned rearward by the corresponding step motor.

When an engine of the vehicle is started, the parking-flap remains horizontal and remaining shift flaps are turned toward the parking-flap by corresponding step motors.

When the engine of the vehicle is stopped, all of the shift flaps of the shift flap unit are turned to the horizontal position by the step motors.

According to an aspect of the present invention, since a protrusion is removed and a flap type electronic automatic transmission lever is provided for a vehicle, operation convenience for the driver is improved by the turning of the shift flaps and safety is increased without a concern of collision.

Further, according to an aspect of the present invention, since the space for a transmission lever is small, the layout and esthetic appearance of a vehicle are excellent, the manufacturing cost is reduced, and the fuel efficiency is improved by a simpler configuration.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
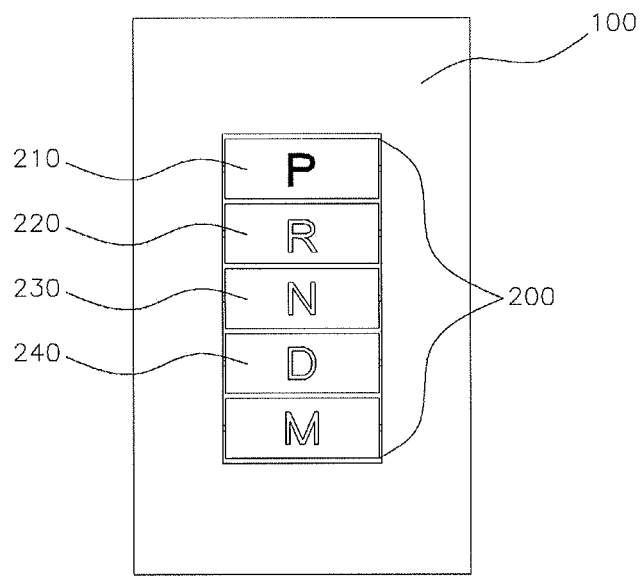
FIG. 1 is a plan view of a flap type electronic automatic transmission lever according to an exemplary embodiment of the present invention.

It should be understood that the appended drawings are not necessarily to scale, presenting a somewhat simplified representation of various preferred features illustrative of the basic principles of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention for improving the operability, safety, and commercial value by making an electronic automatic transmission lever in a flap type includes a console 100 for fixing a flap type electronic automatic transmission lever, a shift flap unit 200 electrically connected to a transmission control unit (TCU) of a vehicle, at the center of the console, and composed of at last four or more shift flaps, touch sensor units 300, each including a shift sensor 310 disposed at the center of the shift flap, a forward-turn sensor 320 disposed at the upper portion of the shift flap, and a rearward-turn sensor 330 disposed at the lower portion of the shift flap, shafts 400, each connected to the bottom of the shift flap to enable the shift flap to turn, step motors 500, each connected to one end of the shaft, and shaft-fixing portions 600, each connected to the opposite end of the shaft.

Figure 2:
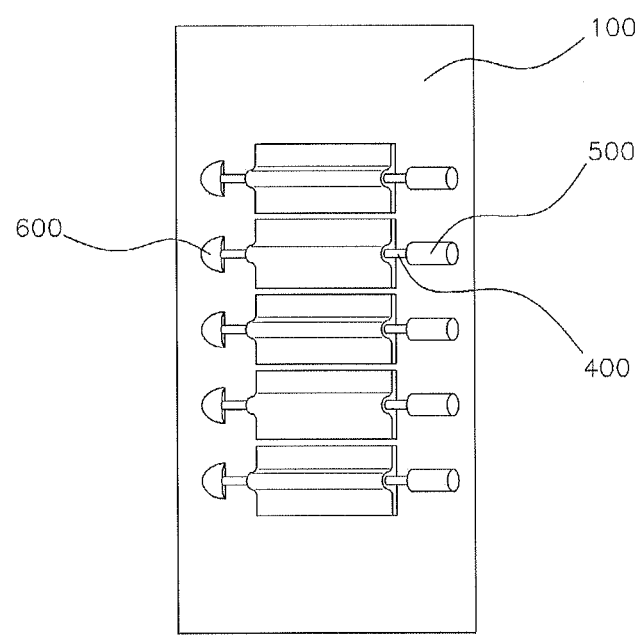
FIG. 2 is a bottom view of the flap type electronic automatic transmission lever according to an exemplary embodiment of the present invention.
Figure 3:
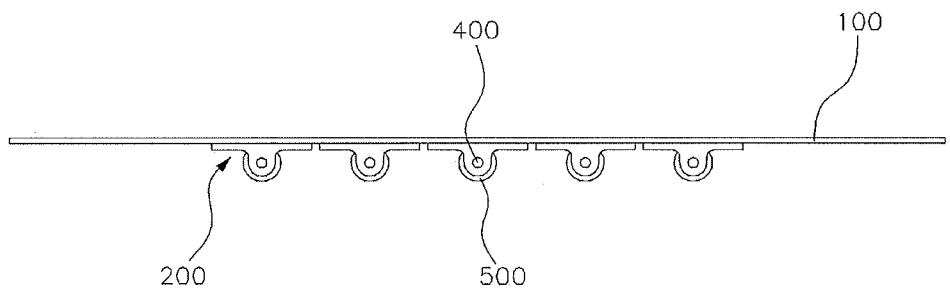
FIG. 3 is a side view of the flap type electronic automatic transmission lever according to an exemplary embodiment of the present invention.

The above components are shown as one of the exemplary embodiments in the drawings, FIG. 1 is a plan view of a flap type electronic automatic transmission lever according to an exemplary embodiment of the present invention, FIG. 2 is a bottom view of the flap type electronic automatic transmission lever according to an exemplary embodiment of the present invention, and FIG. 3 is a side view of the flap type electronic automatic transmission lever according to an exemplary embodiment of the present invention.

The console 100 of the present invention, which is a flat box-shaped part for protecting a transmission lever from dust or shock, may be positioned at various places such as the space between the driver's seat and the passenger seat or the front side of the dashboard, when necessary.

Buttons for various functions may be provided in the empty space on the console 100 with the shift flap unit 200 at the center. For example, a button for adjusting the frequency or volume of a radio, a button for operating and controlling an air-conditioning system for heating/cooling, and a button for operating a heated seat in the driver's seat and the passenger seat may be provided to improve the convenience of driving, using the empty space on the consol.

The shift flap unit 200 electrically connected to the transmission control unit of a vehicle and composed of at least four or more shift flaps is formed at the center of the console 100.

The shift flap unit 200 includes a parking-flap (P) 210, a reverse-flap (R) 220, a neutral-flap (N) 230, and a drive-flap (D) 240, which respectively correspond to the P-, R-, N-, and D-ranges necessary for driving a vehicle, and may further include a high range flap or a low range flap.

The arrangement order of the shift flaps may be changed to improve convenience, when necessary, but it is the most preferable that the parking-flap 210 is disposed at the top, followed by the reverse-flap 220, the neutral-flap 230, the drive-flap 240, and the high or low range flap.

The tops of the shift flaps are formed in a flat rectangle or circle so that the driver can easily touch them, and a hole is formed on the bottoms so that they can be connected and fixed to the shafts 400.

It is preferable that the shift flaps have different colors so that the driver can easily discriminate the shift ranges, and accordingly, the esthetic appearance of the vehicle can also be improved.

Figure 4:
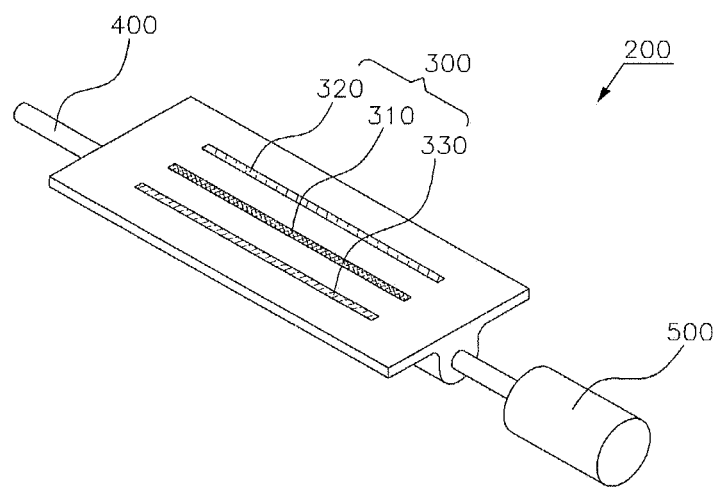
FIG. 4 is a perspective view of a shift range flap according to an exemplary embodiment of the present invention.

FIG. 4 is a perspective view of a shift range flap according to an exemplary embodiment of the present invention.

As shown in FIG. 4, the touch sensor unit 300 is disposed on the shift flap. The touch sensor unit 300 includes the shift sensor 310 disposed at the center of the shift flap, the forward-turn sensor 320 disposed at the upper portion of the shift flap, and the rearward-turn sensor 330 disposed at the lower portion of the shift flap, and the step motor 500 rotates at a predetermined angle by the touch sensor unit recognizing a touch. That is, when the forward-turn sensor senses a touch, the shift flap is turned forward by the step motor 500, and when the rearward-turn sensor senses a touch, the shift flap is turned rearward by the step motor.

The detailed process of turning of the shift flap according to the recognition order of the touch sensor unit 300 will be described in detail.

The shaft 400 is connected to the bottom of the shift flap to enable the shift flap to turn, the step motor 500 for turning the shaft forward or rearward at a predetermined angle is connected to one end of the shaft and the shaft-fixing portion 600 for preventing the shaft from separating is connected to the opposite end of the shaft.

The step motor 500 is an electric motor that turns at predetermined angles by a pulse type voltage, of which the turn angle is in proportion to the number of input pulse signals and the turn speed is in proportion to the frequency of input pulse signals. Although there is a difference depending on the structure of step motors, it is possible to control the step motor at least by 1.5° for each step and a pair of worm gear, having a gear ratio larger than 1, may be used for the step motor.

Figure 5:
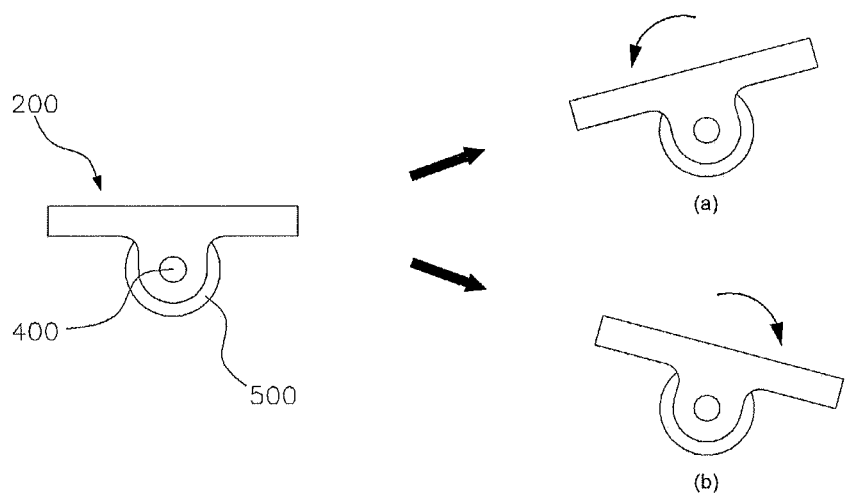
FIG. 5 is a side view showing forward and rearward turns of the shift range flap according to an exemplary embodiment of the present invention.

The shift flaps can be turned forward or rearward in a predetermined range by the configuration described above and FIG. 5 is a side view showing forward and rearward turns of the shift range flap according to an exemplary embodiment of the present invention.

As shown in the figure, the step motor 500 turns the shaft 400 and the shift flap connected with the shaft is turned forward or rearward by the turn of the shaft. The degree of turn may be adjusted in accordance with various conditions such as the shape and configuration of the console 100 and the shape and size of the shift flaps, preferably in the range of 3° to 30°.

Further, separate light sources are disposed under the shift flaps, as many as the shift flaps, and only the light source under the shift flap corresponding to the current shift range is turned on, so the current shift range of the vehicle can be seen clearly.

Figure 6A:
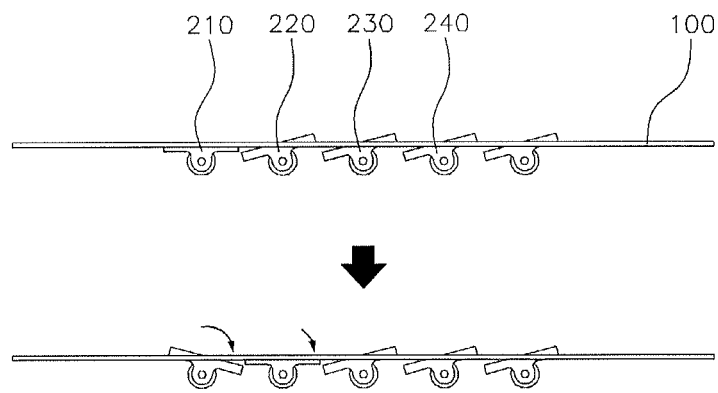
FIGS. 6A and 6B are exemplary views showing a shift range change from the parking-range (P-range) to the reverse-range (R-range) according to an exemplary embodiment of the present invention.
Figure 6B:
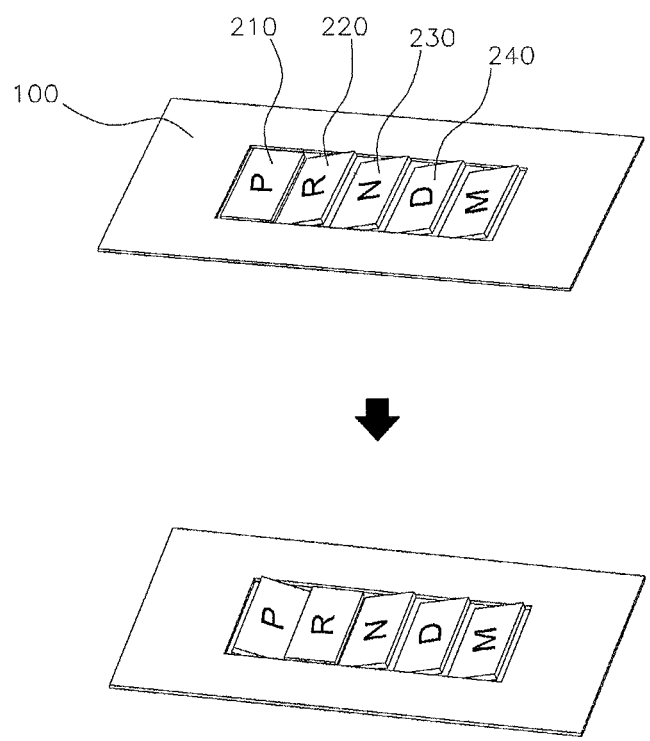

FIGS. 6A and 6B are exemplary views showing a shift range change from the parking-range (P-range) to the reverse-range (R-range) according to an exemplary embodiment of the present invention.

First, when the current shift range is the parking-range, the parking-flap 210 remains horizontal and other shift flaps are turned toward the parking-flap by their step motors 500.

Thereafter, when a touch is sensed sequentially by the shift sensor 310 of the parking-flap 210, the rearward-turn sensor 330 of the parking-flap, and the shift sensor of the reverse-flap 220, the parking-flap is turned toward the reverse-flap, the reverse-flap is turned to the horizontal position, and the other shift flaps keep their positions without turning.

The forward-turn sensor 320 of the reverse-flap 220 has difficulty in sensing a touch due to inclination, so it does not contribute to shifting described above, which is the same in the other shift flaps.

Turning the shift flaps that do not correspond to the current shift range of the vehicle toward the shift flap corresponding to the current shift range is for easily shifting the gears in preparation for the next shifting.

Accordingly, the driver can easily recognize which shift flap a finger currently touches, even by only the feeling of the hand without looking at the console 100 and the shift flap unit 200 while looking at the front area.

Figure 7A:
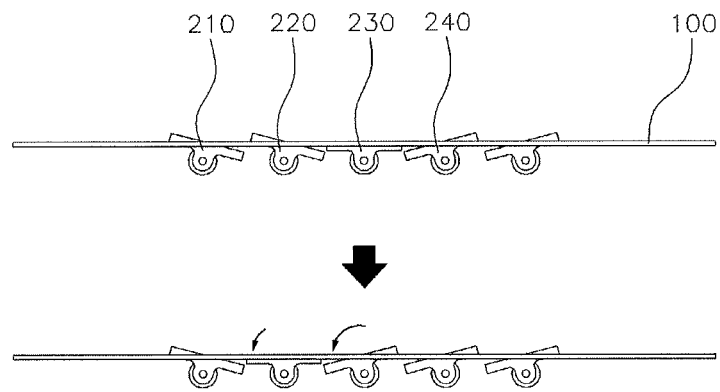
FIGS. 7A and 7B are exemplary views showing a shift range change from the neutral-range (N-range) to the reverse-range (R-range) according to an exemplary embodiment of the present invention.
Figure 7B:
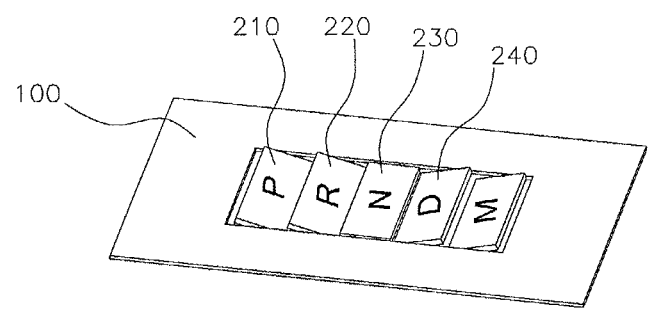
Figure 7B:
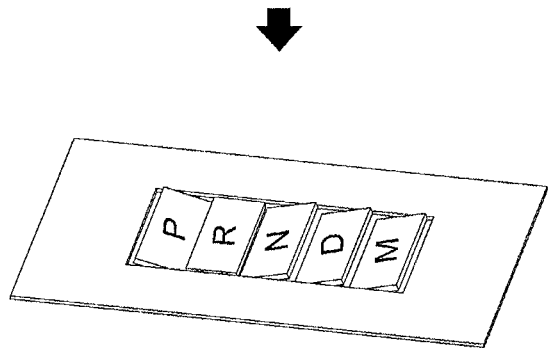

FIGS. 7A and 7B are exemplary views showing a shift range change from the neutral-range (N-range) to the reverse-range (R-range) according to an exemplary embodiment of the present invention.

Similarly, when the current shift range is the neutral-range, the neutral-flap 230 remains horizontal and the other shift flaps turn toward the neutral-flap.

Thereafter, when a touch is sensed sequentially by the shift sensor 310 of the neutral-flap 230, the forward-turn sensor 320 of the neutral-flap, and the shift sensor 310 of the reverse-flap 220, the neutral-flap is turned toward the reverse-flap, the reverse-flap is turned to the horizontal position, and the other shift flaps keep their current positions without turning.

The shift ranges other than the shift ranges described above can be easily changed in the same way.

Further, according to an exemplary embodiment of the present invention, when the engine of a vehicle is started, the parking-flap remains horizontal and other shift flaps are turned toward the parking-flap 210 by the step motors 500. This is for outputting a shifting signal to the parking-range at the start of the vehicle.

When the engine of the vehicle is stopped, all of the shift flaps of the shift flap unit 200 are turned to the horizontal position by the step motors 500. This is for preventing a breakdown that specific shift flaps are inclined even after the engine is stopped and for saving energy that may be unnecessarily wasted.

The present invention has the advantages of providing a driver with excellent operability by making the transmission levers of the related art in a flap type and turning the shift flaps, and of improving safety by removing a protrusion that may cause collision.

Further, since the structure is simple in comparison to the transmission levers of the related art, there is the advantage of reducing the manufacturing cost and improving fuel efficiency accordingly. Furthermore, since the current shift range is seen largely and clearly, the convenience for the driver and esthetic appearance of the vehicle are improved.

For convenience in explanation and accurate definition in the appended claims, the teens "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flap type electronic automatic transmission lever apparatus comprising:
   a console;
   a shift flap unit electrically connected to a transmission control unit (TCU) of a vehicle at a center of the console, and having at least four or more shift flaps;
   touch sensor units each disposed on a corresponding shift flap of the shift flap unit, wherein each said touch sensor unit includes a shift sensor disposed at a center of the corresponding shift flap to detect a first touch, a forward-turn sensor disposed at an upper portion of the corresponding shift flap to detect a second touch, and a rearward-turn sensor disposed at a lower portion of the corresponding shift flap to detect a third touch;
   shafts, each connected to a bottom of the corresponding shift flap to enable the corresponding shift flap to turn;
   step motors, each connected to one end of the corresponding shaft; and
   shaft-fixing portions, each connected to an opposite end of the corresponding shaft,
   wherein, when the forward-turn sensor disposed on the corresponding shift flap senses the second touch, the corresponding shift flap is turned forward by the corresponding step motor, and, when the rearward-turn sensor disposed on the corresponding shift flap senses the third touch, the corresponding shift flap is turned rearward by the corresponding step motor.

2. The flap type electronic automatic transmission lever apparatus of claim 1, wherein the shift flap unit includes a parking-flap (P), a reverse-flap (R), a neutral-flap (N), and a drive-flap (D) and further includes a high range flap or a low range flap.

3. The flap type electronic automatic transmission lever apparatus of claim 2, wherein when an engine of the vehicle is started, the parking-flap remains horizontal and the remaining shift flaps are turned toward the parking-flap by corresponding step motors.

4. The flap type electronic automatic transmission lever apparatus of claim 2, wherein when an engine of the vehicle is stopped, all of the shift flaps of the shift flap unit are turned to a horizontal position by the step motors.

5. The flap type electronic automatic transmission lever apparatus of claim 1, further including light sources disposed under the shift flaps, respectively,
   wherein a current shift range is seen by turning on only the light source under the shift flap corresponding to the current shift range of the vehicle.

* * * * *